United States Patent
Song et al.

(10) Patent No.: US 11,536,451 B2
(45) Date of Patent: Dec. 27, 2022

(54) ROTARY AIR PREHEATER

(71) Applicant: SUZHOU TPRI ENER & ENVIRO TECH CO., LTD., Jiangsu (CN)

(72) Inventors: Yubao Song, Jiangsu (CN); Xinhua Xie, Jiangsu (CN); Xuecheng Zhao, Jiangsu (CN); Jinliang He, Jiangsu (CN); Zhenzu Wei, Jiangsu (CN)

(73) Assignee: SUZHOU TPRI ENER & ENVIRO TECH CO., LTD., Jiangsu (CN)

( * ) Notice: Subject to any disclaimer, the term of this patent is extended or adjusted under 35 U.S.C. 154(b) by 0 days.

(21) Appl. No.: 17/742,621

(22) Filed: May 12, 2022

(65) Prior Publication Data
US 2022/0268440 A1    Aug. 25, 2022

Related U.S. Application Data (63) Continuation of application No. PCT/CN2020/140605, filed on Dec. 29, 2020.

(51) Int. Cl.
*F23L 15/04*    (2006.01)
*F23J 3/02*    (2006.01)
*F28G 1/16*    (2006.01)

(52) U.S. Cl.
CPC .............. *F23L 15/04* (2013.01); *F23J 3/02* (2013.01); *F28G 1/16* (2013.01); *F23J 2700/001* (2013.01); *F23L 2900/15041* (2013.01)

(58) Field of Classification Search
None
See application file for complete search history.

(56) References Cited

U.S. PATENT DOCUMENTS 2,363,870 A * 11/1944 Karlsson ................. F23L 15/02
                                                           122/DIG. 1
3,117,538 A *  1/1964 Baver .................... F23L 15/04
                                                           110/106
(Continued)

FOREIGN PATENT DOCUMENTS

CN    204881327 U    12/2015
CN    109268854 A     1/2019
(Continued)

OTHER PUBLICATIONS

Written Opinion of the International Searching Authority for PCT/CN2020/140605, dated Sep. 28, 2021.
(Continued)

*Primary Examiner* — David J Laux
(74) *Attorney, Agent, or Firm* — Schmeiser, Olsen & Watts, LLP (57) ABSTRACT

A rotary air preheater is provided, including: a rotor and a steam soot-blowing device arranged in a cold secondary air inlet channel of secondary air section. The steam soot-blowing device includes a steam sootblower, a first pipe communicating with the steam sootblower and extending in a radial direction of the rotor, and nozzle assemblies communicating with the first pipe. The nozzle assembly includes a first nozzle assembly and a second nozzle assembly, and the first nozzle assembly is located upstream of the second nozzle assembly in a rotational direction of the rotor. The first nozzle assembly includes a sprayer, and diameter of an inlet of the sprayer is smaller than diameter of an outlet thereof. The second nozzle assembly includes at least one nozzle, and steam jet velocity at the outlet of the sprayer is greatly smaller than steam jet velocity at an outlet of the nozzle.

4 Claims, 3 Drawing Sheets

(56) References Cited

U.S. PATENT DOCUMENTS

| | | | | |
|---|---|---|---|---|
| 3,156,200 A | * | 11/1964 | Leeson | F23L 15/02 |
| | | | | 110/232 |
| 3,254,704 A | * | 6/1966 | Beisel, Jr. | F22B 37/24 |
| | | | | 165/81 |
| 4,165,716 A | * | 8/1979 | Thomas | F23L 15/04 |
| | | | | 122/356 |
| 4,279,592 A | * | 7/1981 | Grant | F23C 7/06 |
| | | | | 432/223 |
| 4,444,128 A | * | 4/1984 | Monro | F23J 15/006 |
| | | | | 110/215 |
| 5,044,424 A | * | 9/1991 | Monro | F23L 15/04 |
| | | | | 165/5 |
| 2002/0002820 A1 | * | 1/2002 | Takehara | F23R 3/50 |
| | | | | 60/39.511 |
| 2004/0002029 A1 | * | 1/2004 | Giella | F23L 15/04 |
| | | | | 431/11 |
| 2010/0251975 A1 | * | 10/2010 | Mattison | F23L 15/04 |
| | | | | 165/104.31 |
| 2022/0268440 A1 | * | 8/2022 | Song | F23J 3/02 |

FOREIGN PATENT DOCUMENTS

| | | |
|---|---|---|
| CN | 208566739 U | 3/2019 |
| CN | 111623365 A | 9/2020 |

OTHER PUBLICATIONS

7Hang, Ren-min—"The Optimization of Blowing Track and Style for Air Preheater Sootblower"; Power Station Auxiliary Equipment, vol. 34, No. 4—Dec. 2013.

* cited by examiner

ROTARY AIR PREHEATER

CROSS-REFERENCE TO RELATED APPLICATION

This application is a continuation application to PCT/CN2020/140605, having a filing date of Dec. 29, 2020, the entire contents of which are incorporated herein by reference.

FIELD OF TECHNOLOGY

The following relates to a rotary air preheater.

BACKGROUND

Coal-fired utility boiler is conventionally equipped with a rotary air preheater, which includes a flue gas section, a secondary air section and a primary air section in a circumferential direction, wherein a rotor consisted of upper and lower layers of flat-plate heat exchange elements passes through the flue gas section, the secondary air section and the primary air section in sequence during it rotates, to carry out periodic heat storage and heat release processes as following: in the flue gas section, the high-temperature flue gas flows through the heat exchange elements from top to bottom, the flue gas releases heat and its temperature decreases, and the heat exchange elements store heat and temperature thereof increases; in the secondary air section and the primary air section, the cold secondary air and the cold primary air flow through the heat exchange elements from bottom to top, cold air absorbs heat and its temperature increases, and the heat exchange elements releases heat and temperature thereof decreases. In the flue gas section, ammonia slip from the upstream SCR denitration system and $SO_3$ in the flue gas are easy to generate ash deposition of ammonium bisulfate on the surface of the heat exchange element at the cold end of the air preheater rotor, which blocks the flue gas channel between the heat exchange elements. To keep the channel between the heat exchange elements of the air preheater unblocked, a steam sootblower is usually arranged above the heat exchange element at the hot end and below the heat exchange element at the cold end of the rotor in the flue gas section, by using steam jets to scour the surfaces of the heat exchange elements on-line intermittently, to blow off the ash deposition on the surfaces by shearing. In the flue gas section, the flue gas flows through the heat exchange elements from top to bottom, the steam jets of the steam sootblower at the hot end flows downstream and purges downward, the steam jets of the steam sootblower at the cold end flows upstream and purges upward, the steam pressure in the sootblower's pipe is about 0.8 to 1.07 MPa, and the temperature is about 300 to 350° C.

To enhance the purging effect of the ash deposition of ammonium bisulfate between the heat exchange elements of the air preheater, various improvements have been tried on the steam sootblower, some of them are listed as following: patent CN208566739 discloses a high-pressure water online cleaning device of rotary air preheater, which accommodates high-pressure water and steam together to form a dual-fluid sootblower, which can separately spray high-pressure water and steam to blow soot; patent CN204881327 discloses a steam sootblower device of a rotary air preheater, and paper "The Optimization of Blowing Track and Style for Air Preheater Sootblower", both the two proposed a rake-type multi nozzle sootblower based on the single-tube nozzle, to improve the residence time of the heat exchange elements of the rotor through the steam purging section; and patent CN111623365 discloses refined automatic soot blowing system of a rotary air preheater and a soot blowing control method, and puts forward an on-line monitoring method of the smudginess and blockage of heat exchange elements, which automatically decides the operation of the steam sootblower according to the smudgy degree. In the above technologies of the steam sootblower of air preheater, CN204881327 increases the residence time of the heat exchange element of the air preheater rotor on steam blowing section in the circumference, however, for highly cohesive ash deposition containing ammonium bisulfate, the effect of the conventional steam sootblower is limited, the main reason is that when the jet steam reaches the surface of the heat exchange element, although the central jet velocity is still retained at 80 to 120 m/s, the purging steam temperature decreases to about 100 to 150° C. due to the entrainment of the surrounding low-temperature flue gas. For the highly cohesive ash deposition containing ammonium bisulfate, even though the steam jet has strong scouring and shearing effects, due to the low temperature of the jet steam, the intensity of ash deposition cannot be weakened by heating and gasifying the ammonium bisulfate in the ash deposition, which also seriously reduces the purging effect of the steam sootblower on ash deposition of ammonium bisulfate.

SUMMARY

An aspect relates to a steam soot-blowing device with high-velocity and low-velocity nozzle assemblies, based on the temperature distribution characteristics of the heat exchange element at the cold side of the air preheater rotor on the circumference and the steam jet characteristics of the sootblower.

A steam soot-blowing device for a rotary air preheater, comprises a steam sootblower and a first pipe communicating with the steam sootblower, wherein the steam soot-blowing device further comprises nozzle assemblies communicating with the first pipe, and the nozzle assemblies comprises a first nozzle assembly and a second nozzle assembly, the first nozzle assembly comprises a throttle pipe with one end communicating with the first pipe, and a sprayer communicating with the other end of the throttle pipe, wherein a throttle shrinkage hole is provided inside the throttle pipe, diameter of the throttle shrinkage hole is smaller than pipe diameter of the throttle pipe, and diameter of an inlet of the sprayer is smaller than diameter of an outlet thereof;

the second nozzle assembly comprises a distribution pipe communicating with the first pipe and at least one nozzle communicating with the distribution pipe;

wherein steam jet velocity at the outlet of the sprayer is greatly smaller than steam jet velocity at an outlet of the nozzle.

A rotary air preheater is provided, which heats and gasifies ammonium bisulfate in the ash deposition on the surface of the heat exchange elements through low-velocity and high-temperature steam jet, and then the loosed ash deposition without ammonium bisulfate was sheared and purged by using high-velocity and low-temperature steam jet.

A rotary air preheater with a steam soot-blowing device, comprises a rotor rotating around a central sleeve, wherein a flue gas section, a primary air section and a secondary air section are arranged within the rotor in its circumferential direction and separated by seals, a heat exchange element is arranged on the rotor, the air preheater further comprises a steam soot-blowing device, the steam soot-blowing device is arranged in the cold secondary air inlet channel of the secondary air section, the steam soot-blowing device comprises a steam sootblower, a first pipe communicating with the steam sootblower and extending in a radial direction of the rotor, and nozzle assemblies communicating with the first pipe, the nozzle assemblies comprises a first nozzle assembly and a second nozzle assembly, the first nozzle assembly is located upstream of the second nozzle assembly in a rotational direction of the rotor, the first nozzle assembly comprises a throttle pipe with one end communicating with the first pipe, and a sprayer communicating with the other end of the throttle pipe, a throttle shrinkage hole is provided within the throttle pipe, diameter of the throttle shrinkage hole is smaller than pipe diameter of the throttle pipe, and diameter of an inlet of the sprayer is smaller than diameter of an outlet thereof; the second nozzle assembly comprises a distribution pipe communicating with the first pipe, and at least one nozzle communicating with the distribution pipe, wherein steam jet velocity at the outlet of the sprayer is smaller than steam jet velocity at an outlet of the nozzle.

Due to the use of the above technical solutions, the present disclosure has the following advantages over the conventional art:

(i) the nozzle assemblies of the present disclosure improve the purging effect of the ash deposition of ammonium bisulfate, the upstream steam jet with high-temperature and low-velocity heats and gasifies ammonium bisulfate in the ash deposition on the surface of the heat exchange elements, so that the compact ash deposition is changed into a fluffy structure, which greatly reduces the hardness and bonding strength of the ash deposition, which improves the shearing and scouring effect on the ash deposition of the downstream steam jet with low-temperature and high-velocity, thus effectively improves the removal effect of the ash deposition of ammonium bisulfate;

(ii) the present disclosure improves the steam blowing conditions of the soot-blowing device, the soot blowing-device is arranged in the cold secondary air inlet channel of the secondary air section, which corresponds to the section of the heat exchange elements with the highest temperature on the circumference of the air preheater rotor and the lowest ammonium bisulfate deposition area, and in addition, the steam jet is in the same direction as the cold secondary air, which eliminates the influence of the counter-flow obstruction of the traditional steam jet, and creates excellent conditions for the steam jet to shear and purge the ash deposition containing ammonium bisulfate;

(iii) the design method in the present disclosure improves the steam purging uniformity, the circumferential radians of the heating zone and the purging zone of the nozzle assemblies of the soot blowing-device are correspondingly increased along with increase of the radius of the air preheater rotor, and the circumferential angles corresponding to all sets of purging tracks are approximately equal, so that the amount of heated and purged steam borne by heat exchange elements in unit areas of different radial zones of the rotor tends to be consistent, and the phenomena of underblowing of heat exchange elements at the outer side of the air preheater rotor and overblowing of heat exchange elements at the inner side of the air preheater rotor are avoided.

BRIEF DESCRIPTION

Some of the embodiments will be described in detail, with references to the following Figures, wherein like designations denote like members, wherein.

DETAILED DESCRIPTION

In the following, the technical schemes of the present disclosure are explained clearly and completely below in conjunction with the drawings, and apparently, the described embodiments are merely a few of the embodiments of the present disclosure, not all the embodiments.

Figure 1:
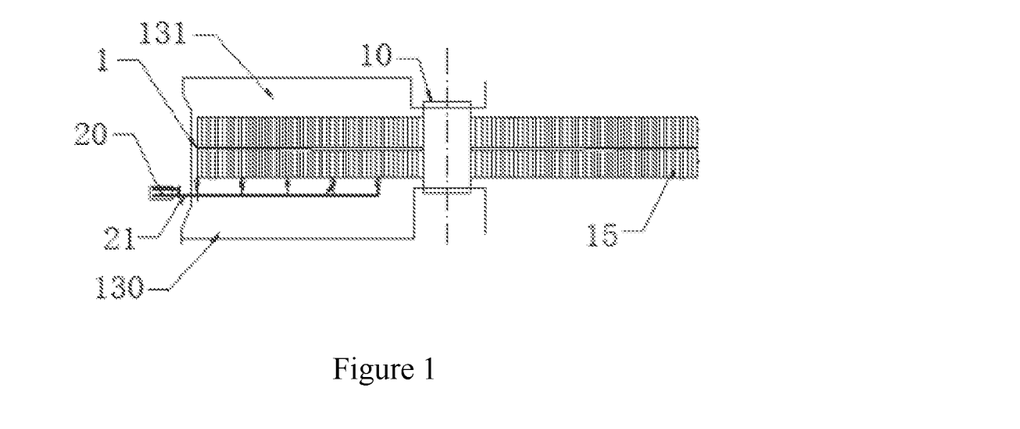
FIG. 1 is a schematically front view of a rotary air preheater in an embodiment.
Figure 2:
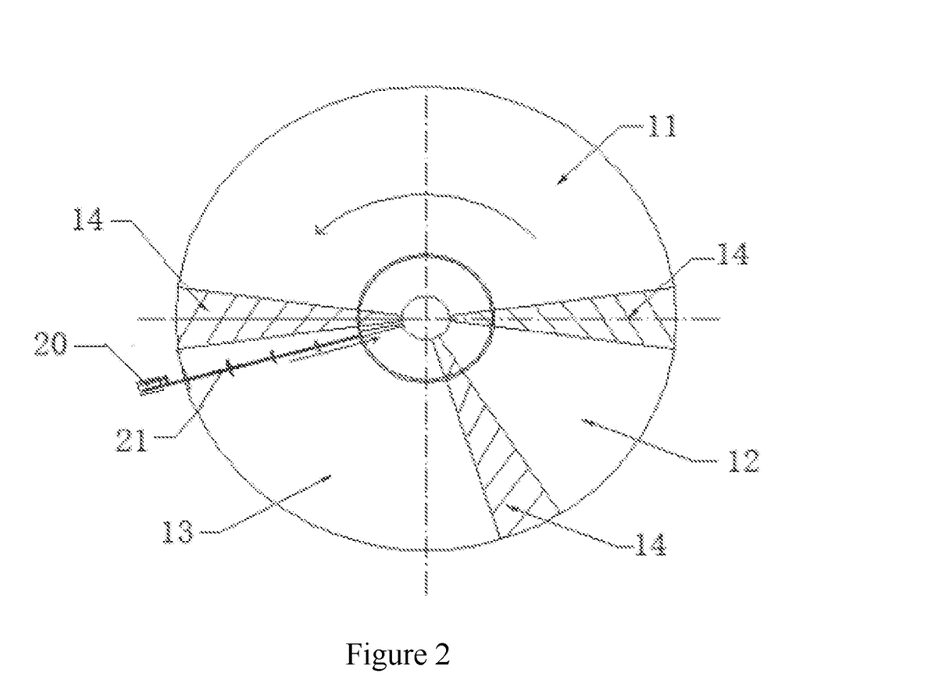
FIG. 2 is a schematically top view of the rotary air preheater in the embodiment.

A rotary air preheater with a steam soot-blowing device, as shown in FIG. 1 and FIG. 2, comprises a rotor 1 rotating around a central sleeve 10, wherein a flue gas section 11, a primary air section 12 and a secondary air section 13 are arranged within the rotor 1 in its circumferential direction, the flue gas section 11, the primary air section 12 and the secondary air section 13 are separated by a seal 14, and a metallic heat exchange element 15 is arranged on the rotor 1. The rotation process passes through the flue gas section 11, the secondary air section 13 and the primary air section 12 in sequence to carry out periodic heat storage and heat release processes as following: in the flue gas section 11, the high-temperature flue gas flows through the heat exchange element 15 from top to bottom, the flue gas releases heat and its temperature decreases, and the heat exchange element 15 stores heat and its temperature increase; in the secondary air section 12 and the primary air section 13, the cold primary air and the cold secondary air flow through the heat exchange element 15 from bottom to top, the cold air absorbs heat and its temperature increases, and the heat exchange element 15 releases heat and its temperature decreases.

The air preheater further comprises a steam soot-blowing device, and the steam soot blowing device is arranged in the cold secondary air inlet channel 130 of the secondary air section and close to the seal 14 at the side of the flue gas section 11.

Figure 3:
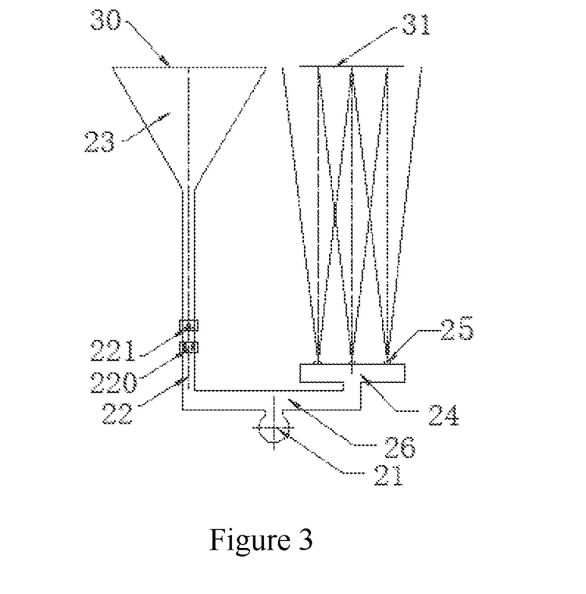
FIG. 3 is a schematically front view of a nozzle assembly in the embodiment.

As shown in FIG. 3, the steam soot-blowing device comprises a steam sootblower 20, a first pipe 21 communicating with the steam sootblower 20 and extending in the radial direction of the rotor 1, and a plurality of groups of nozzle assemblies communicating with the first pipe 21.

The total length of the first pipe 21 is equal to the radius of the rotor 1, and is divided into n sections at equal intervals of 1 to 2 m, and according to the section lengths, n groups of nozzle assemblies are arranged spaced from inside to outside in the radial direction of the rotor 1, that is, from the end of the first pipe 21 close to the central sleeve 10 to the outermost side of the rotor 1, the numbering of the nozzle assembly increases from the first group to the n-th group. The first pipe 21 is arranged movably in the radial direction of the rotor 1, and the move stroke of the first pipe 21 in the radial direction of the rotor 1 is the distance between two adjacent groups of nozzle assemblies.

Figure 5A:
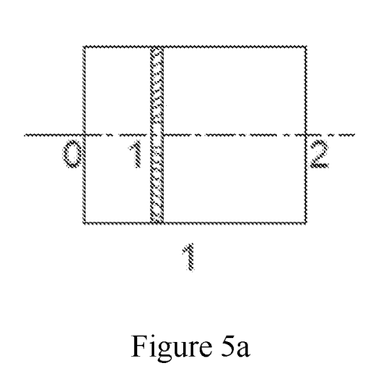
FIG. 5a is a sectional view of a throttle pipe.

Each group of the nozzle assemblies comprises a first nozzle assembly and a second nozzle assembly, and in the rotational direction of the rotor, the first nozzle assembly is located upstream of the second nozzle assembly. Wherein:

the first nozzle assembly comprises a throttle pipe 22 with one end communicating with the first pipe 21, and a sprayer 23 communicating with the other end of the throttle pipe 22, wherein the throttle pipe 22 is provided with a throttle shrinkage hole 220 and a circular block 221 located downstream of the throttle shrinkage hole 220, both the throttle shrinkage hole 220 and the block 221 are connected with the throttle pipe 22 by nuts, the diameter of the throttle shrinkage hole 220 is smaller than the diameter of the throttle pipe 22, and the diameter of an inlet of the sprayer 23 is smaller than the diameter of an outlet thereof. The length of the throttle pipe 22 is 400-500 mm, and the pipe diameter thereof is 20-30 mm.

In this embodiment, the sprayer 23 has a quadrangular pyramid-shaped cavity of which the bottom communicates with the throttle pipe 22, and an arc-shaped top surface covering the quadrangular pyramid-shaped cavity, wherein sprayer holes are opened on the top surface, and the distance between the top surface of the sprayer 23 and the lower surface of the heat exchange element at the cold end 15 is 10-15 mm. The sprayer holes are evenly distributed on the top surface of the sprayer 23, and have a diameter of about 1 to 3 mm, the total area of the sprayer holes is about 40% to 60% of the top surface area of the sprayer 23, specifically, a shower head can be used. In addition, the width of the arc-shaped top surface of the sprayer 23 in the radial direction of the rotor 1 is 1.0 to 1.5 times the jet steam purging radius of a Venturi nozzle 25, the arc length is 1 to 6 times the jet steam purging radius of a Venturi nozzle 25, and the arc length increases as the numbering of the nozzle assemblies increases.

The high-pressure and high-temperature steam in the first pipe 21 passing through the throttle shrinkage hole 220, the block 221 and the sprayer 2, under the principle of adiabatic isoenthalpy expansion without work, is decompressed and expanded into low-pressure and high-temperature steam, with the temperature in the sprayer 23 of about 300° C., the pressure being slightly higher than the static pressure of the external cold secondary air by 200 to 500 Pa, and the steam jet velocity of the sprayer hole outlets on the top surface of the sprayer 23 of about 20 to 30 m/s, and merges into a vertical upward steam jet with low-velocity and high-temperature, the velocity of the jet entering the channel of the heat exchange element 15 at the cold end of the rotor 1 is about 15 to 23 m/s, and a steam heating zone is formed in the circumference, the steam jet velocities with low-velocity and high-temperature of the nozzle assemblies of different numbering are equal, the flow rate is set by the diameter of the throttle shrinkage hole 220 in the throttle pipe 22, and with the numbering of the nozzle assembly increases from the first group to the n-th groups, the diameter of the throttle shrinkage hole 220 gradually increases.

Figure 5B:
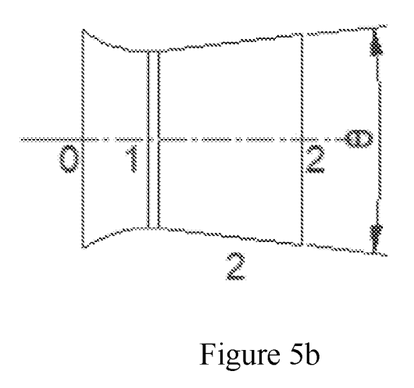
FIG. 5b is a sectional view of a Venturi nozzle.

The second nozzle assembly comprises a distribution pipe 24 communicating with the first pipe 21 and at least one Venturi nozzle 25 communicating with the distribution pipe 24. The distribution pipe 24 may adopt for example a rake-type blowpipe, 1 to 5 Venturi nozzles 25 of the same model are arranged on the distribution pipe 24 of each second nozzle assembly, and with the numbering of the nozzle assemblies increases from the first group to the n-th groups, the number of the Venturi nozzles 25 gradually increases. The throat diameter of the Venturi nozzles 25 is about 6 to 10 mm, the outlet diameter is about 8 to 12 mm, the spread angle is 10 to 15°, and under the principle of adiabatic isentropy decompression expansion with work, the outlet steam jet velocity reaches 1 to 2 times the Mach number, the temperature is rapidly reduced to about 100 to 150° C., and with the expansion distance between the throats and the outlets of the Venturi nozzles 25 decreasing appropriately, the outlet steam jet is in an incomplete expansion state with the temperature above 120° C. and the pressure about 0.2 to 0.3 MPa, which is higher than the ambient atmospheric pressure. The distance between the outlet of the Venturi nozzle 25 and the lower surface of the heat exchange element 15 at the cold end is about 400 to 600 mm, the blowing radius of the steam jet of a single Venturi nozzle 25 on the lower surface of the heat exchange element 15 is about 50 to 100 mm, the center to center distance between two adjacent Venturi nozzles 25 is equal to 0.5 to 1 steam jet purging radius, the steam jet purging tracks of the Venturi nozzles 25 in the same group overlap by 0.5 to 1 purging radius, and form a steam purging zone in the circumference. After entraining a large amount of surrounding cold secondary air along the way, the central velocity of the steam jet when it reaches the lower surface of the heat exchange element 15 is reduced to about 100 to 150 m/s, the temperature of the steam jet is gradually reduced, and the temperature of the jet is maintained close to 100° C. by means of the gradual release of the latent heat of vaporization of the steam.

The throttle pipe 22, the distribution pipe 24 and the first pipe 21 are connected by a three-way pipe 26 through nuts, and the distance between the three-way pipe 26 and the first pipe 21 is 10-20 mm. The center line of the throttle pipe 22, the center line of the distribution pipe 24 and the center lines of the Venturi nozzles 25 all extend in the axial direction of the rotor 1, and the center line of the first pipe 21 extends in the radial direction of the rotor 1.

After throttling and decompression, the boiler steam enters the first pipe 21 of the steam sootblower 20, and after further decompression and expansion through the high and low velocity nozzle assemblies, the steam forms two vertically upward steam jets, one of which has low-velocity and high-temperature and the other one has high-velocity and low-temperature, at multiple positions of the rotor 1 in the radial direction in the cold secondary air channel, which flow downstream with the cold secondary air from bottom to top and enter the channel of the heat exchange element 15 at the cold end of the above rotor 1, and during the circular rotation process, firstly, ammonium bisulfate in the ash deposition of the heat exchange element 15 is gasified through the heating zone formed by the steam jet with low-velocity and high-temperature, then the ash deposition is removed through the purging zone formed by the steam jet with high-velocity and low-temperature, and the gasified ammonium bisulfate and the stripped ash deposition enter the boiler furnace with the hot secondary air.

The first pipe 21 extends in the radial direction of the rotor 1 from inside to outside, the central angles corresponding to the circumferential arcs of the fan-shaped heating zones of the first group to the n-th group of nozzle assemblies are almost same in size, the residence time of the heat exchange element 15 at the cold end of the rotor 1 in each steam heating zone is not less than 0.2 s, and the residence time in each steam purging zone is not less than 0.2 s. The first pipe 21 may be propelled intermittently and retreated directly, the propelling step is 0.5 to 1 time of the steam purging radius of the Venturi nozzles on the lower surface of the heat exchange element, and if the number of time is small, the overlap of the purging track increases, and the air preheater rotor is rotated by 1 to 2 cycles in the residence time of each step. According to the degree of that the differential pressure on the flue gas side of the air preheater displayed by the DCS online analyzer of the unit is higher than the design value, the steam sootblower is put into operation once at different time intervals such at every 8 hours, every day, and every week, and the greater the degree of that the flue gas differential pressure is higher than the design value, the shorter the soot-blowing interval.

The steam jet parameter design of the steam soot-blowing device in this embodiment is described in detail below.

Mark the throttle pipe as 1, the Venturi nozzle as 2, the inlet of the throttle pipe as (1, 0), the throttle shrinkage hole as (1, 1), and the outlet of the throttle pipe as (1, 2); mark the inlet of the Venturi nozzle as (2, 0), the throat of the Venturi nozzle as (2, 1), and the outlet of the Venturi nozzle as (2, 2), According to the critical steam state of the throttle shrinkage hole and the throat position 1 of the Venturi nozzle, the steam flow of the throttle pipe and the Venturi nozzle is calculated by formulas (1) to (3). Where, $h_0$ is obtained by checking the enthalpy entropy diagram according to the steam pressure $P_0$ and temperature $T_0$. After obtaining the critical pressure $P_1$ of the throttle shrinkage hole and the throat position of the Venturi nozzle by using the isentropy principle, the steam enthalpy $h_1$ and specific volume $v_1$ are obtained by checking the enthalpy entropy diagram, and the steam flow $G_1$ of a single throttle pipe or Venturi nozzle is designed as:

$$c_1 = 44.72 \times \sqrt{h_0 - h_1} \quad (2)$$

where: $A_1$ is the cross-sectional area of the throttle pipe or of the throat of the Venturi nozzle; $c_1$ is the steam velocity at the throttle pipe or the throat of Venturi nozzle; $v_1$ is the steam specific volume; $h_0$ is the stagnant steam enthalpy in the first pipe; $h_1$ is the critical steam enthalpy at the throttle pipe or the throat of the Venturi nozzle; $P_0$ is the stagnant steam pressure in the first pipe; $P_1$ is the critical steam pressure at the throttle pipe or the throat of the Venturi nozzle; $\gamma$ is the adiabatic coefficient of superheated steam.

The steam pressure at the sprayer outlet is about 200 to 500 Pa higher than the external ambient pressure, the steady flow of steam ahead and behind the throttle shrinkage hole in the throttle pipe belongs to the isoenthalpy process that adiabatic expansion does not work, and after determining the steam enthalpy by the pressure $P_0$ and temperature $T_0$ of the stagnant steam in the first pipe, according to the steam pressure at the sprayer outlet, the steam temperature and specific volume $v_{1,2}$ after decompression and expansion is obtained by checking the enthalpy entropy diagram, and the steam velocity $c_{1,2}$ of the sprayer holes on the top surface of the sprayer is calculated by formula (4):

$$c_{1,2} = \frac{G \times v_{1,2}}{A_{1,2} \times \psi} \quad (4)$$

wherein: $v_{1,2}$ is the steam specific volume of the sprayer holes on the top surface of the sprayer; $A_{1,2}$ is the top surface area of the sprayer; c is the proportion of the flow area of the sprayer holes. The steady flow of steam ahead and behind the throat of the Venturi nozzle belongs to the isentropy process that adiabatic expansion does technical work, the enthalpy and entropy values are determined by the stagnant steam pressure $P_0$ and temperature $T_0$ in the first pipe, the initial value of the steam pressure $P_{2,2}$ at the outlet of the Venturi nozzle is set to be 0.5 times the critical pressure $P_{2,1}$ at the throat of the Venturi nozzle, the steam enthalpy, temperature and specific volume at the outlet of the Venturi nozzle are obtained by checking the enthalpy entropy diagram, the outlet steam jet velocity is calculated by formula (5), the outlet steam flow is calculated by formula (6), and the flow deviation between the throat and the outlet of the Venturi nozzle is calculated by formula (7), where, when the deviation is greater than 5%, adjust the outlet steam pressure to 1.1 times the previous value, and calculate the outlet steam flow by rechecking the enthalpy entropy diagram; when the deviation is less than −5%, adjust the outlet steam pressure to 0.9 times the previous value, and calculate the outlet steam flow by rechecking the enthalpy entropy diagram; until the deviation between the two is not greater than ±5%, determine the steam pressure, temperature and velocity at the nozzle outlet:

$$G_{2,2} = \frac{A_{2,2} \times c_{2,2}}{v_{2,2}} \quad (6)$$

where: $h_{2,2}$ is the steam enthalpy at the outlet of the Venturi nozzle; $c_{2,2}$ is the steam velocity at the outlet of the Venturi nozzle; $A_{2,2}$ is the outlet area of the Venturi nozzle; $v_{2,2}$ is the steam specific volume at the outlet of the Venturi nozzle; $G_{2,2}$ is the steam flow at outlet of the Venturi nozzle; $G_{2,1}$ is the steam flow at the throat of the Venturi nozzle; $\xi$ is the steam flow deviation.

The steam at the outlet of the Venturi nozzle is a free jet. After determining the distance between the outlet of the Venturi nozzle and the lower surface of the heat exchange element at the cold end of the rotor, the steam purging radius of a single Venturi nozzle is calculated by formula (8), and the central velocity is calculated by formula (9), the jet flow along the way is calculated by formula (10), and the jet temperature is calculated by formula (11), where, when the calculated value of the jet temperature is lower than 100° C., the steam around the jet gradually releases the gasification latent heat to make the jet temperature close to but not higher than 100° C.:

$$c = c_{2,2} \times \frac{3.28}{\frac{s}{R_2} \times \tan\left(\frac{\theta}{2}\right) + 1} \quad (9)$$

where: R is the steam purging radius of the Venturi nozzle; $R_2$ is the outlet radius of the Venturi nozzle; s is the distance from the outlet of the Venturi nozzle to the lower surface of the heat exchange element at the cold end of the rotor; $\theta$ is the spread angle of the Venturi nozzle; c is the purging central jet velocity; G is the jet flow of the steam purging section; $T_a$ is the central jet temperature of the steam purging section; $T_e$ is the ambient temperature; $T_{2,2}$ is the steam temperature at the outlet of the Venturi nozzle.

After obtaining the steam flow of the throttle pipe and the Venturi nozzle in each group of nozzle assembly, the steam consumption $G_{total}$ of the steam sootblower is calculated by formula (12):

$$G_{total} = \sum_{j=1}^{n}\left(G_{1,j} + \sum_{i=1}^{m_j} G_{2,j,i}\right) \quad (12)$$

in the formula: $G_{1,j}$ is the steam flow of the throttle pipe of the j-th group of nozzle assemblies; $G_{2,j,i}$ is the steam flow of the i-th Venturi nozzle of the j-th group of nozzle assembly; n is the total number of nozzle assemblies; $m_j$ is the total number of the Venturi nozzles in the j-th group of nozzle assembly; j is the numbering of nozzle assembly; i is the numbering of Venturi nozzles.

The air preheater flue gas side resistance recorded online by the unit DCS can reflect the blockage degree of the heat exchange element channel of the air preheater rotor by the ash deposition containing ammonium bisulfate, however, due to the excessive influence of factors such as operating load, it is necessary to evaluate the steam heating and purging effects of the steam sootblower body.

(1) The nozzle assemblies on the first pipe form the steam heating zone and the purging zone on the lower surface of the heat exchange element on the cold end of the air preheater rotor, and the central angle corresponding to the circumferential arc of each zone can be calculated by formula (13) and formula (14), where the central angles corresponding to the n heating zones should be almost same in size, and the central angles corresponding to the n purging zones should be almost same in size.

$$\vartheta_{1,j} = \frac{A_{rc,j}}{2 \times \pi \times R_{r,j}} \quad (13)$$

$$\vartheta_{2,j} = \frac{\sum_{j=1}^{m_j} R_i}{2 \times \pi \times R_{r,j}} \quad (14)$$

(2) The residence time of the heat exchange element of the air preheater rotor passing through the steam heating zone and the purging zone of each nozzle assembly in the circumferential direction can be calculated by formula (15) and formula (16), respectively, where the residence time of the n heating zones should be almost same, and the residence time of the n purging zones should be almost same:

$$\Delta\tau_{1,j} = \frac{A_{rc,j}}{2 \times \pi \times R_{r,j}} \times \frac{1}{c_{rpm}} \quad (15)$$

$$\Delta\tau_{2,j} = \frac{\sum_{i=1}^{m_j} R_1}{2 \times \pi \times R_{r,j}} \times \frac{1}{c_{rpm}} \quad (16)$$

(3) According to the steam flow of the throttle pipe and the Venturi nozzle, the heating steam flow and the purging steam flow of different nozzle assemblies can be calculated by formula (17) and formula (18), respectively.

$$M_{1,j} = G_{1,i,j} \quad (17)$$

$$M_{2,j} = \sum_{i=1}^{m_j} G_{2,1,j,i} \quad (18)$$

(4) After obtaining the heating steam flow and the purging steam flow of each nozzle assembly, according to the heating zone and the purging zone in the circumference of the radial position of the air preheater rotor where each nozzle assembly is located, the amount of steam received by the heat exchange element per unit area on the circumference is calculated by formula (19) and formula (20):

$$SFUA_{2,j} = \frac{M_{21,j} \times \frac{1}{c_{rpm}}}{2 \times \pi \times R_{r,j} \times R} \quad (20)$$

(5) Using the relative deviation method, the relative deviation of the amount of heating steam received by the heat exchange element per unit area of the n groups of nozzle assemblies is calculated by formula (21), and the relative deviation of the purging steam amount received by the heat exchange element per unit area of the n groups of nozzle assemblies is calculated by formula (22), conventionally, the relative deviation of heating steam is required to be less than ±10%, and the relative deviation of purging steam is required to be less than ±20%.

$$RD_{2,j} = \frac{SFUA_{2,j} - \frac{1}{n}\sum_{j=1}^{n} SFUA_{2,j}}{\frac{1}{n}\sum_{j=1}^{n} SFUA_{2,j}} \times 100 \quad (22)$$

in the formula: $g_{1,j}$ is the central angle corresponding to the j-th group of heating zone; $A_{rc,j}$ is the arc length of the j-th group of heating zone; $R_{r,j}$ is the rotor radius of the air preheater corresponding to the j-th group of nozzle assembly; $g_{2,j}$ is the central angle corresponding to the j-th group of purging zone; $R_i$ is the steam purging radius of the Venturi nozzle; $\Delta\tau_{1,j}$ is the time for the heat exchange element at the cold end of the rotor to stop at the j-th group of heating zone; $\Delta\tau_{2,j}$ is the time for the heat exchange element at the cold end of the rotor to stop at the j-th group of purging zone; $c_{rpm}$ is the rotor speed of the air preheater; $M_{1,j}$ is the heating steam flow of the j-th group of nozzle assembly; $G_{1,1,j}$ is the steam flow at the throttle shrinkage hole of the j-th group of nozzle assembly; $M_{2,j}$ is the purging steam flow of the j-th group of nozzle assembly; $G_{2,1,j,i}$ is the steam flow at the throat of the i-th Venturi nozzle of the j-th group of nozzle assembly; $SFUA_{1,j}$ is the amount of heating steam received by the heat exchange element per unit area at the cold end of the rotor at the j-th group of nozzle assembly; $SFUA_{21,j}$ is the amount of purging steam received by the heat exchange element per unit area at the cold end of the rotor at the j-th group of nozzle assembly; $RD_{1,j}$ is the relative deviation of the heating steam amount of the j-th group of nozzle assembly; $RD_{2,j}$ is the relative deviation of the purging steam amount of the j-th group of nozzle assembly.

Take the air preheaters of a 1000 MW unit as an example to further illustrate.

1) The 1000 MW unit is equipped with 2 sets of 34-VI (T)-2000-SMR rotor rotary tri-section air preheater, the rotor diameter of the air preheater is 16400 mm, and the diameter of the central sleeve is 1560 mm; the air preheater rotor is divided into upper and lower layers, namely the hot end of the rotor and the cold end of the rotor, wherein the heat exchange element in the upper layer is made of low-carbon steel, with a height of 1100 mm and a thickness of 0.5 mm; the heat exchange element in the lower layer is made of enamel-coated Corten steel, with a height of 1000 mm and a thickness of 1.2 mm, and the through-flow porosity is about 78%.

2) The central angle of the flue gas section is 165°, the central angle of the secondary air section is 100°, the central angle of the primary air section is 50°, and the total of the three fan-shaped seals is 45°; the air preheater rotor rotates along the flue gas section—secondary air section—primary air section at a speed of 1.2 r/min, and the temperature of the cold secondary air in the cold secondary air inlet channel at the bottom of the secondary air section under full load of the unit is 23° C., the static pressure is 0.103140 MPa.

Figure 4:
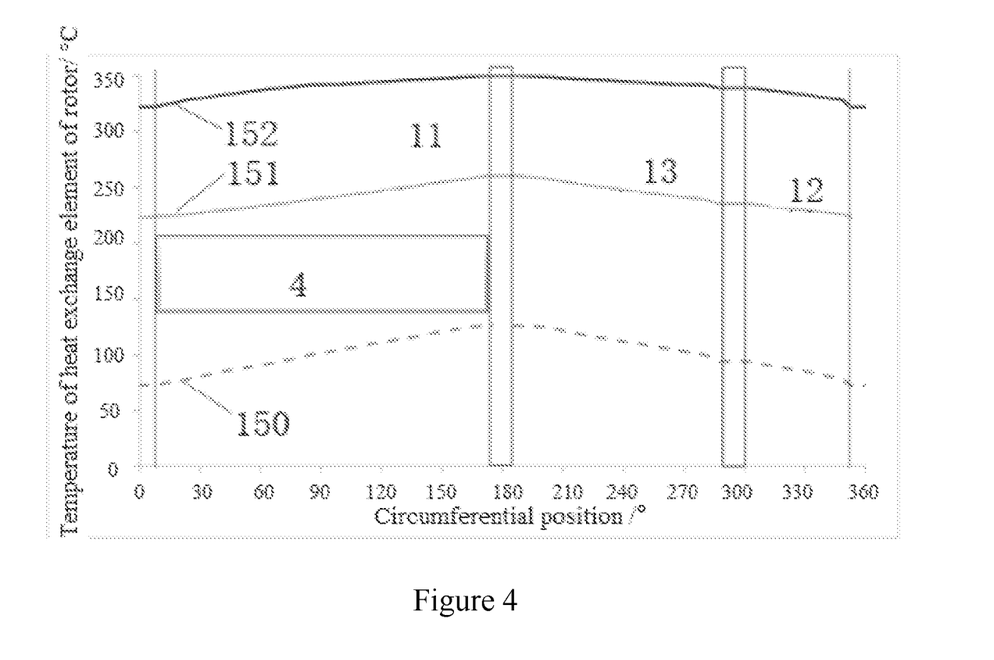
FIG. 4 is a temperature distribution diagram of the heat exchange elements of the air preheater on the circumference of the hot end and the cold end in the embodiment.

3) Under the rated load of the unit, the temperature distribution of the top surface of the heat exchange element at the hot end of the rotor, the top surface and the bottom surface of the heat exchange element at the cold end of the rotor in the circumferential direction is calculated, as shown in FIG. 4. In the flue gas section, the inlet flue gas temperature is 364.8° C., the outlet discharge flue gas temperature is 123.1° C., and the condensation of ammonium bisulfate in the flue gas is deposited on the surface of the heat exchange element at the cold end of the rotor with a temperature ranging from about 150 to 190° C. When the heat exchange element of the air preheater rotor leaves the flue gas section and enters the secondary air section, the temperature of the heat exchange element reaches the highest, and the ammonium bisulfate deposition zone is formed in the zone of about 400~600 mm above the lower surface of the heat exchange element.

4) In the inlet cold secondary air channel at the bottom of the secondary air section, near the seal between the flue gas section and the secondary air section, a steam sootblower of this embodiment is arranged, the first pipe length is consistent with the radial length of the air preheater rotor 7420 mm, the first pipe length is 7420 mm, and a total of 5 groups of nozzle assemblies are arranged from the gun head near the central sleeve to the outside of the air preheater rotor, and the distance between adjacent nozzle assemblies is 1484 mm.

5) The diameter of the first pipe is 50 mm, and the relevant design parameters of the 5 groups of nozzle assemblies are shown in Table 1, wherein, the first group is located at a radius of 2264 mm in the radial direction of the rotor, with one Venturi nozzle and a throttle shrinkage hole with a diameter of 5.4 mm; the second group is located at a radius of 3748 mm with two Venturi nozzles and a throttle shrinkage hole with a diameter of 7.0 mm; the third group is located at a radius of 5232 mm with two Venturi nozzles and a throttle shrinkage hole with a diameter of 8.2 mm; the fourth group is located at a radius of 6716 mm with three Venturi nozzles and a throttle shrinkage hole with a diameter of 9.2 mm; the fifth group is located at a radius of 8200 mm with four Venturi nozzles and a throttle shrinkage hole with a diameter of 10.3 mm. The distance from the outlet of the Venturi nozzle to the lower surface of the heat exchange element at the cold end of the rotor is 500 mm.

TABLE 1

Nozzle assemblies design parameters

| Items | Unit | Value | | | | |
|---|---|---|---|---|---|---|
| No. of the nozzle assembly | — | 1 | 2 | 3 | 4 | 5 |
| Radial stagnation position of the nozzle assembly | mm | 2264 | 3748 | 5232 | 6716 | 8200 |
| Number of Venturi nozzle(s) in the nozzle assembly | PCS | 1 | 2 | 2 | 3 | 4 |
| Venturi nozzle throat diameter | mm | 9 | 9 | 9 | 9 | 9 |
| Length from the Venturi nozzle throat to the outlet | mm | 5 | 5 | 5 | 5 | 5 |
| Spread angle of the Venturi nozzle | ° | 12 | 12 | 12 | 12 | 12 |
| Venturi nozzle outlet diameter | mm | 10.1 | 10.1 | 10.1 | 10.1 | 10.1 |
| Distance between the Venturi nozzle and the heat exchange element | mm | 500 | 500 | 500 | 500 | 500 |
| Steam purging radius of the Venturi nozzle | mm | 57.6 | 57.6 | 57.6 | 57.6 | 57.6 |
| Throttle shrinkage hole diameter | mm | 5.4 | 7.0 | 8.2 | 9.2 | 10.3 |
| Circular arc length of the heating zone | mm | 69 | 115 | 161 | 202 | 259 |
| Center angle corresponding to the arc of the heating zone | ° | 1.7 | 1.8 | 1.8 | 1.7 | 1.8 |

6) The steam pressure in the first pipe is 0.78 MPa and the temperature is 310° C., and after decompression and expansion through the throttle shrinkage hole or the throat of the Venturi nozzle, the steam pressure at the outlet of the throttle pipe is 0.103 MPa and the temperature is 302° C., and the steam pressure at the outlet of the Venturi nozzle is 0.2 MPa and the temperature is 150.5° C. The detailed data are shown in Table 2.

TABLE 2

Changes of steam parameters of the sootblower

| Items | Unit | Value | | | | |
|---|---|---|---|---|---|---|
| No. of the nozzle assembly | — | 1 | 2 | 3 | 4 | 5 |
| Absolute pressure of the first pipe steam | MPa | 0.78 | 0.78 | 0.78 | 0.78 | 0.78 |

TABLE 2-continued

Changes of steam parameters of the sootblower

| Items | Unit | Value | | | | |
|---|---|---|---|---|---|---|
| First pipe steam temperature | ° C. | 310 | 310 | 310 | 310 | 310 |
| First pipe steam enthalpy | kJ/kg | 3078.5 | 3078.5 | 3078.5 | 3078.5 | 3078.5 |
| Critical steam pressure | MPa | 0.426 | 0.426 | 0.426 | 0.426 | 0.426 |
| Critical steam temperature | ° C. | 233.3 | 233.3 | 233.3 | 233.3 | 233.3 |
| Critical steam enthalpy | kJ/kg | 2929.1 | 2929.1 | 2929.1 | 2929.1 | 2929.1 |
| Venturi nozzle outlet steam pressure | MPa | 0.2 | 0.2 | 0.2 | 0.2 | 0.2 |
| Venturi nozzle outlet steam temperature | ° C. | 150.5 | 150.5 | 150.5 | 150.5 | 150.5 |
| Venturi nozzle outlet steam enthalpy | kJ/kg | 2770.1 | 2770.1 | 2770.1 | 2770.1 | 2770.1 |
| Throttle pipe outlet steam pressure | MPa | 0.103 | 0.103 | 0.103 | 0.103 | 0.103 |
| Throttle pipe outlet steam temperature | ° C. | 302.0 | 302.0 | 302.0 | 302.0 | 302.0 |
| Throttle pipe outlet steam enthalpy | kJ/kg | 3078.5 | 3078.5 | 3078.5 | 3078.5 | 3078.5 |

7) The steam jet velocity at the outlet of the Venturi nozzle is 547 m/s, the central velocity reaching the lower surface of the heat exchange element at the cold end of the rotor is reduced to 156 m/s, the jet velocity at ¼ radius is 65 m/s, and the purging radius is 58 mm; the steam jet velocity at the outlet of the throttle pipe is 25 m/s, and the velocity of the steam entering the heat exchange element channel at the cold end of the rotor is reduced to 19.2 m/s. The purging steam flow of the steam sootblower is 46.7 kg/min, the heating steam flow is 16.0 kg/min, and the total is 62.7 kg/min, and in the radial direction of the air preheater rotor, the relative deviation of the steam flow received by the five groups of heat exchange elements is −16.6% to 16.4%. The detailed data are shown in Table 3.

TABLE 3

Steam jet parameters of the sootblower

| Items | Unit | Value | | | | |
|---|---|---|---|---|---|---|
| No. of the nozzle assembly | — | 1 | 2 | 3 | 4 | 5 |
| Steam purging radius of the Venturi nozzle | mm | 58 | 58 | 58 | 58 | 58 |
| Venturi throat critical flow | kg/s | 0.064 | 0.064 | 0.064 | 0.064 | 0.064 |
| Venturi nozzle outlet steam jet velocity | m/s | 547 | 547 | 547 | 547 | 547 |
| Venturi nozzle purging center jet velocity | m/s | 156 | 156 | 156 | 156 | 156 |
| Venturi nozzle jet mixed gas temperature | ° C. | 100 | 100 | 100 | 100 | 100 |
| Number of Venturi nozzle(s) in the nozzle assembly | PCS | 1 | 2 | 2 | 3 | 4 |
| Residence time of the heat exchange element in the purging zone | s | 0.20 | 0.24 | 0.18 | 0.20 | 0.22 |
| Purging zone steam flow | kg/s | 0.065 | 0.130 | 0.130 | 0.194 | 0.259 |
| Amount of purging steam per unit area of the rotor circumference | kg/m | 3.96 | 4.78 | 3.43 | 4.00 | 4.37 |
| Relative deviation of the purging steam per unit area of the circumference of each zone | % | −3.6 | 16.4 | −16.6 | −2.6 | 6.4 |
| Heating zone steam jet velocity | m/s | 25 | 25 | 25 | 25 | 25 |
| Residence time of the heat exchange element in the heating zone | s | 0.24 | 0.24 | 0.25 | 0.24 | 0.25 |
| Velocity of the heating steam in the heat exchange element channel | m/s | 19.2 | 19.2 | 19.2 | 19.2 | 19.2 |
| Amount of heating steam per unit area of the rotor circumference | kg/m$^2$ | 1.39 | 1.44 | 1.41 | 1.39 | 1.42 |
| Relative deviation of the heating steam per unit area of the circumference of each zone | % | −1.4 | 2.0 | 0.2 | −1.7 | 0.9 |
| Heating zone total steam | kg/min | | | 16.0 | | |
| Purging zone total steam | kg/min | | | 46.7 | | |
| Total steam flow | kg/min | | | 62.7 | | |

8) The propelling step length of the first pipe is consistent with the steam purging radius length of the Venturi nozzle, and is 58 mm, the propelling speed is 0.806 mm/s, the propelling stroke is 1484 mm, and the time for one purge is 1842 s.

Although the present invention has been disclosed in the form of preferred embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

The claims are as follows:

1. A rotary air preheater, comprising:
    a rotor rotating around a central sleeve;
    a flue gas section;
    a primary air section and a secondary air section being arranged within the rotor in a circumferential direction, wherein the flue gas section, the primary air section, and the secondary air section being spaced, and a heat exchange element being arranged on the rotor; and
    a steam soot-blowing device arranged in a cold secondary air inlet channel of the secondary air section, wherein the steam soot-blowing device comprises a steam sootblower, a first pipe communicating with the steam sootblower and extending in a radial direction of the rotor, and a nozzle assembly communicating with the first pipe;
    wherein the nozzle assembly comprises a first nozzle assembly and a second nozzle assembly, the first nozzle assembly located upstream of the second nozzle assembly in a rotational direction of the rotor;
    wherein the first nozzle assembly comprises a throttle pipe with one end communicating with the first pipe, and a sprayer communicating with the other end of the throttle pipe, a throttle shrinkage hole is provided inside the throttle pipe, a diameter of the throttle shrinkage hole is smaller than a diameter of the throttle pipe, and a diameter of an inlet of the sprayer is smaller than a diameter of an outlet thereof;
    wherein the second nozzle assembly comprises a distribution pipe communicating with the first pipe, and at least one nozzle communicating with the distribution pipe, and a steam jet velocity at the outlet of the sprayer is smaller than a steam jet velocity at an outlet of the at least one nozzle.

2. The rotary air preheater according to claim 1, wherein the first pipe is arranged movably in the radial direction of the rotor.

3. The rotary air preheater according to claim 2, wherein a plurality of groups of nozzle assemblies are provided, and a move stroke of the first pipe is a distance between two adjacent groups of nozzle assemblies.

4. The rotary air preheater according to claim 1, wherein a distance between the outlet of the sprayer and a lower surface of the heat exchange element is 10-15 mm; a distance between the outlet of the nozzle and the lower surface of the heat exchange element is 400-600 mm.

* * * * *